United States Patent
Sanap et al.

(10) Patent No.: US 9,301,325 B1
(45) Date of Patent: Mar. 29, 2016

(54) METHOD AND APPARATUS FOR LOW-ENERGY SENSOR WIRELESS CONNECTION

(71) Applicant: Marvell International Ltd., Hamilton (BM)

(72) Inventors: Sachin Shamrao Sanap, Pune (IN); Kedar Sovani, Pune (IN)

(73) Assignee: Marvell International Ltd., Hamilton (BM)

(*) Notice: Subject to any disclaimer, the term of this patent is extended or adjusted under 35 U.S.C. 154(b) by 159 days.

(21) Appl. No.: 14/102,733

(22) Filed: Dec. 11, 2013

Related U.S. Application Data

(60) Provisional application No. 61/736,118, filed on Dec. 12, 2012.

(51) Int. Cl.
*H04W 4/00* (2009.01)
*H04W 76/02* (2009.01)
*H04W 48/16* (2009.01)

(52) U.S. Cl.
CPC .............. *H04W 76/02* (2013.01); *H04W 48/16* (2013.01)

(58) Field of Classification Search
USPC ................................. 370/252, 328, 338, 401
See application file for complete search history.

(56) References Cited

U.S. PATENT DOCUMENTS

| | | | |
|---|---|---|---|
| 7,761,232 B2* | 7/2010 | Woodings .................... | 701/468 |
| 2004/0264427 A1* | 12/2004 | Jaakkola et al. .............. | 370/338 |
| 2008/0025331 A1* | 1/2008 | Tabata ......................... | 370/409 |
| 2011/0002261 A1* | 1/2011 | Mocanu et al. .............. | 370/328 |
| 2012/0116694 A1* | 5/2012 | Norair .......................... | 702/50 |
| 2013/0182697 A1* | 7/2013 | Tuominen et al. ............ | 370/338 |

* cited by examiner

*Primary Examiner* — Ricky Ngo
*Assistant Examiner* — Christine Ng

(57) ABSTRACT

The present disclosure describes techniques and apparatuses for low-energy sensor wireless connection. In some aspects, a data transfer session is initiated between a wireless interface of a sensor and an access point of a wireless network. The wireless interface is then associated with the access point to establish a wireless network connection in accordance with a setting usable to establish the wireless network connection, and without having to scan for the access point to discover the setting. The wireless interface is then configured to communicate with the access point over the wireless network connection using an IP address, and without obtaining the IP address during the data transfer session. Data corresponding to an environmental condition surrounding the sensor is then transmitted to the access point over the wireless network connection. After the data is transmitted to the access point, the wireless interface is deactivated to terminate the data transfer session.

20 Claims, 5 Drawing Sheets

METHOD AND APPARATUS FOR LOW-ENERGY SENSOR WIRELESS CONNECTION

CROSS REFERENCE TO RELATED APPLICATION(S)

This present disclosure claims priority under 35 U.S.C. §119(e) to U.S. Provisional Patent Application Ser. No. 61/736,118 filed Dec. 12, 2012, the disclosure of which is incorporated by reference herein in its entirety.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless sensors can be employed for a variety of purposes—e.g., to monitor physical and environmental conditions. Once a wireless sensor has collected data—e.g., data indicative of sensed physical and environmental conditions, the wireless sensor may then transmit the data to a central location for aggregation and analysis by way of a wireless network. Some wireless sensors, such as those employed by battery-powered devices, are generally sensitive to an amount of power consumed.

To conserve power, a wireless sensor can generally operate in accordance with an active state and a low-power state (or shutdown state). For example, to transmit data to a central location, a wireless sensor can transition from the low-power state (or shutdown state) to the active state, perform the operations required to transmit the data in as short an amount of time as possible, and then return to the low-power or shutdown state. In some instances, a wireless sensor may monitor physical and environmental conditions while operating in the active state. In other instances, however, a wireless sensor may monitor physical and environmental conditions outside of the active state and merely pass the data indicative of the sensed conditions during the active state.

When conventional techniques are used by a wireless sensor to transmit data over a WiFi network (e.g., an 802.11n or 802.11ac wireless network) to a central location for aggregation, the time required by a wireless sensor to establish a connection with an access point is significantly greater than the time to perform other steps associated with the actual transmission of the data to the central location.

SUMMARY

This summary is provided to introduce subject matter that is further described below in the Detailed Description and Drawings. Accordingly, this summary should not be considered to describe essential features nor used to limit the scope of the claimed subject matter.

In general, in one aspect, this specification describes a method for activating a wireless interface of a sensor to initiate a data transfer session with an access point of a wireless network. The wireless interface is then associated with the access point to establish a wireless network connection in accordance with a setting that is usable to establish the wireless network connection with the access point. The association of the wireless interface with the access point is performed without having to scan for the access point to discover the setting that is usable to establish the wireless network connection. Once associated with the access point, the wireless interface is configured to communicate with the access point over the wireless network connection using an IP address. The configuring of the wireless interface is performed without obtaining the IP address during the data transfer session. Data corresponding to an environmental condition surrounding the sensor is then transmitted via the wireless interface to the access point over the established wireless network connection. After the data is transmitted to the access point, the wireless interface of the sensor is deactivated to terminate the data transfer session with the access point.

In general, in another aspect, this specification describes a sensor device that includes a communication manager to activate a wireless interface to initiate a data transfer session with an access point of a wireless network. The communication manager then causes the wireless interface to associate with the access point to establish a wireless network connection with the access point in accordance with a setting that is usable to establish the wireless network connection with the access point. The association with the access point is performed without having the wireless interface scan for the access point to discover the setting that is usable to establish the wireless network connection. Once associated with the access point, the communication manager then configures the wireless interface for communication with the access point over the wireless network using an IP address. The communication manager performs the configuring without obtaining the IP address during the data transfer session. The communication manager then causes the wireless interface to transmit data corresponding to an environmental condition surrounding the sensor to the access point over the established wireless network connection. After the data is transmitted to the access point, the communication manager deactivates the wireless interface to terminate the data transfer session with the access point.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference numbers in different instances in the description and the figures indicate like elements.

DETAILED DESCRIPTION

Wireless sensors are employed for a variety of purposes to monitor physical and environmental conditions. Some wireless sensors, such as those employed by battery-powered devices, are sensitive to an amount of power consumed, however. Conventional techniques for transmitting data sensed by a wireless sensor require that the wireless sensor perform one or more operations during which the wireless sensor consumes power. The disclosure describes apparatuses and techniques for a wireless sensor to connect to an access point in a manner that reduces an amount of time the wireless sensor spends in establishing a connection with the access point to transmit data to a central location. As a result, the described apparatuses and techniques enable a wireless sensor to consume less power than conventional techniques.

A wireless interface of a wireless sensor may be activated to initiate a data transfer session. The wireless interface may then associate with the access point to establish a wireless network connection with the access point. To do so, the wireless interface can use known connection settings rather than scan for the access point during a data transfer session to discover the connection settings. To communicate with the access point over the wireless connection, the wireless interface is configured using Internet Protocol (IP) address information. By using known IP address information, the wireless interface can be configured without receiving that information during the data transfer session. Rather than discover connection settings and IP address information in conjunction with each data transfer session, this information can instead be discovered in conjunction with one data transfer session and then stored at the wireless sensor. In this way, the connection settings and IP address information may be used from storage to initiate subsequent data transfer sessions without again performing operations to acquire that information (e.g., without scanning for the access point and receiving an IP address from a DHCP server).

Once the wireless connection is established with the access point and the wireless interface configured for communication, data indicative of environmental conditions sensed by the wireless sensor may be transmitted to the access point. After the data is transmitted, the wireless interface of the wireless sensor is deactivated to terminate the data transfer session.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
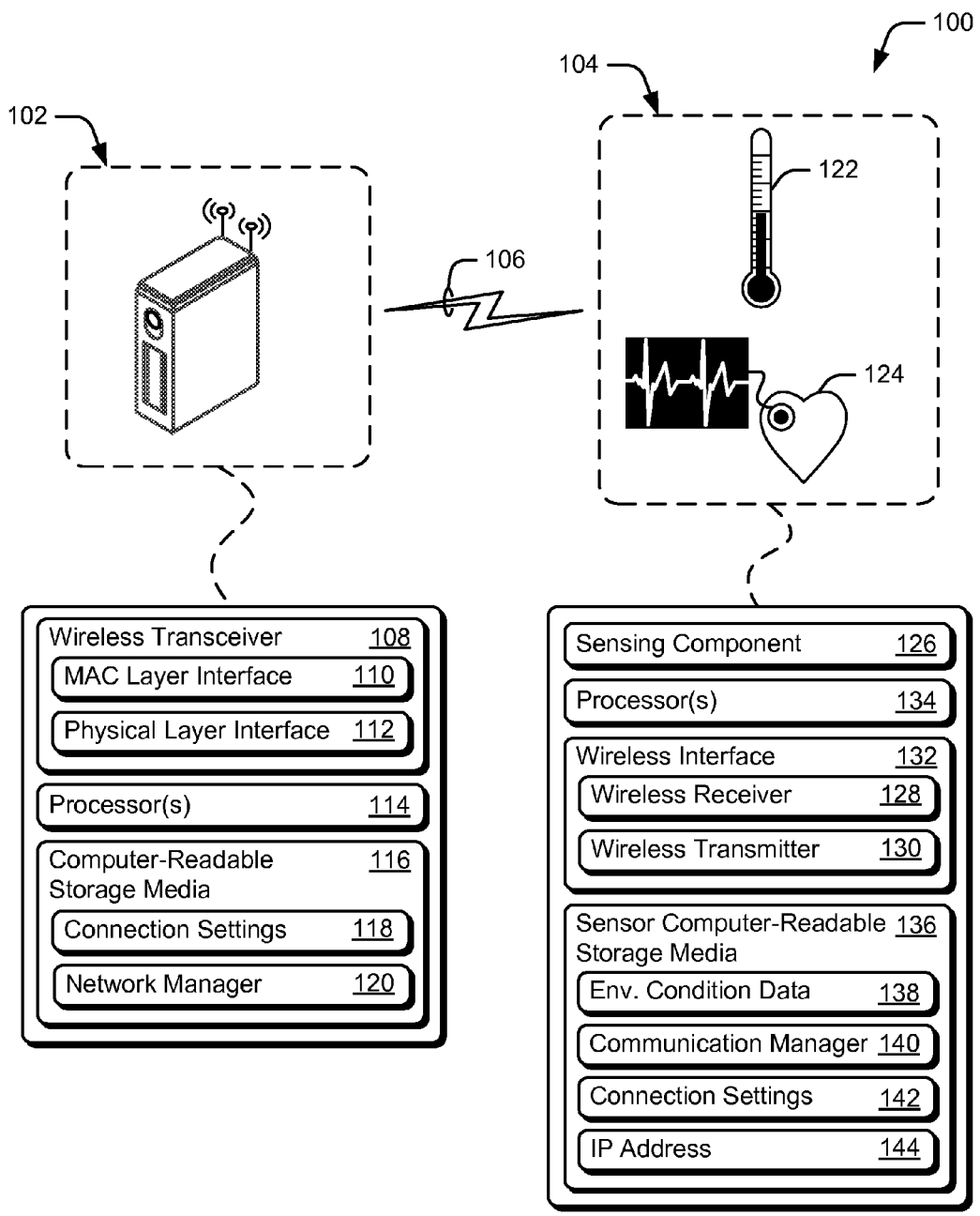
FIG. 1 illustrates an operating environment having an access point to a wireless network and wireless sensor devices capable of communicating with the access point in accordance with one or more aspects.

FIG. 1 illustrates an example operating environment 100 having a wireless access point 102 (access point 102) and wireless sensor devices 104 (sensor devices 104), each of which are wireless-network-enabled and capable of communicating data, packets, and/or frames over communication link 106. Communication link 106 may be any suitable type of wireless communication link. For example, communication link 106 may be implemented in whole or part as a wireless local-area-network (WLAN), ad-hoc WLAN, infrastructure WLAN, wireless mesh network, wireless personal-area-network (WPAN), wireless wide-area-network (WWAN), or short-range wireless network. Communication link 106 may also implement various peer-to-peer communication protocols such as wireless fidelity (WiFi) direct link or a peer-link.

Access point 102 enables wireless sensors to pass data (e.g., indicative of physical and environmental conditions monitored by such sensors) to a central location for aggregation and analysis. Various configurations of access point 102 are contemplated such as a wireless router, a combined wireless router and modem, a desktop computer, server, laptop computer, personal computer (PC), mobile-internet device (MID), gaming console, internet-enabled televisions, "smart" appliances, and so on.

Access point 102 includes a wireless transceiver 108 that provides a wireless interface to handle various communication protocols, such as IEEE 802.11, Bluetooth™, and others mentioned above and elsewhere herein. Wireless transceiver 108 may be configured to implement any suitable type of wireless interface, such as a WLAN, cellular, or Bluetooth™ interface, or a combination thereof. Alternately or additionally, wireless transceiver 108 may be further configured to operate in one or more communication modes, such as infrastructure, peer-to-peer, mesh, peer-link, and the like.

Although shown as a single transceiver, wireless transceiver 108 may be implemented as a separate transmitter and receiver (not shown), and may be hardware combined with or separate from firmware or software. Wireless transceiver 108 communicates data via a media access control (MAC) layer interface 110 and a physical (PHY) layer interface 112, either of which may be hardware combined with or separate from firmware or software. Data of access point 102 is packetized, framed, and/or addressed for communication via MAC layer interface 110. The packetized or framed data is then transmitted over a wireless medium by PHY layer interface 112.

Access point 102 is shown including processor(s) 114 and computer-readable storage media 116 (CRM 116). Processor 114 may be a single core or multiple core processor composed of a variety of materials, such as silicon, polysilicon, high-K dielectric, copper, and so on. CRM 116 may include any suitable memory or storage device, such as random-access memory (RAM), static RAM (SRAM), dynamic RAM (DRAM), non-volatile RAM (NVRAM), read-only memory (ROM), or Flash memory useful to store device data (e.g., connection settings 118 of access point 102). The connection settings 118 may be acquired over the wireless network to enable wireless devices to establish a network connection with the access point 102. The wireless settings may include beacon interval(s), supported data rates, channels over which the access point 102 is discoverable, capability information of the access point 102, WiFi Protected Access Information Element (WPA IE), Robust Security Network Information Element (RSN IE), 11d country information, and/or communication band(s), which are usable to establish a wireless network connection with access point 102. Device data stored by CRM 116 may also include collected sensor data, user data, multimedia data, applications, firmware and/or an operating system, which are executable by processor 114 to enable communication with access point 102.

CRM 116 also includes network manager 120, which, in one implementation, is embodied on CRM 116 (as shown). Alternately or additionally, network manager 120 may be implemented in whole or part as hardware logic or circuitry integrated with or separate from other components of access point 102 (e.g., wireless transceiver 108). In at least some aspects, network manager 120 configures wireless transceiver for communication over multiple wireless networks enabling access point 102 to communicate with respective sensors and devices associated with each of these wireless networks.

Sensor devices 104 are shown including temperature sensor 122 and medical device sensor 124. Other implementations of sensor device 104 contemplated include various peripherals and/or devices configured to sense physical and environmental conditions, such as motion-sensitive sensors, optically-sensitive sensors, pressure sensors, chemical detection sensors, capacitive sensors, micro-electromechanical systems sensor (MEMS), and so forth. Sensor devices 104 can sense physical and environmental conditions using any suitable sensing component 126.

Each of sensor devices 104 includes a wireless receiver 128 and a wireless transmitter 130 for providing a wireless interface 132 to communicate via various protocols or wireless networks, such as IEEE 802.11 or Bluetooth™. Sensor devices 104 operate in one or more communication modes, such as infrastructure, peer-to-peer, mesh, peer-link, and the like. Wireless receiver 128 and wireless transmitter 130 may be separate (shown) or combined (not shown) and may be hardware combined with or separate from firmware or software.

Sensor devices 104 are also illustrated as including processor(s) 134, sensor computer-readable storage media 136 (sensor CRM 136), and environmental condition data 138, which, in one implementation, is embodied on sensor CRM 136. Sensor CRM 136 may include any suitable memory or storage device, such as random-access memory (RAM), read-only memory (ROM), or Flash memory useful to store environmental condition data 138 or other applications and/or firmware of the sensor device 104.

Environmental condition data 138 is indicative of physical and environmental conditions monitored by the sensing component 126 of sensor device 104. Sensing component 126 may be employed to sense particular physical and environmental conditions, such as temperature, light, sound, motion, chemicals, measures of various physiological statistics (e.g., vital signs), and so forth. The environmental condition data 138 may then be derived based on the conditions sensed by the sensors.

Sensor devices 104 are also illustrated as including communication manager 140, connection settings 142, and IP address information 144. Communication manager 140 may be embodied on sensor CRM 136 (as shown). Alternately or additionally, communication manager 140 may be implemented in whole or part as hardware logic or circuitry integrated with or separate from other components of sensor device 104 (e.g., wireless interface 132). The connection settings 142 may include those connection settings 118 of access point 102 that a sensor device 104 has discovered as a result of establishing a wireless network connection with the access point 102.

In at least some aspects, communication manager 140 employs wireless interface 132 to implement low-energy sensor wireless connection techniques. The communication manager 140 may employ wireless interface 132 to conduct a data transfer session over a wireless network connection with access point 102. To establish the wireless network connection, connection settings 142 and IP address information 144 may be accessed from storage of the sensor device 104, such as from sensor CRM 136.

The connection settings 142 may be used by wireless interface 132 to associate with access point 102. By using connection settings that are stored, wireless interface 132 can associate with access point 102 without scanning available channels for the access point 102 during the data transfer session. In other words, using known connection settings (e.g., connection settings 142) enables wireless interface 132 to skip the act of scanning for access point 102 when establishing a wireless network connection with access point 102.

The IP address information 144 may be used by the communication manager 140 in a similar fashion to configure the wireless interface 132 for communication with the access point 102. In particular, wireless interface 132 can be configured for communication with access point 102 without receiving an IP address (e.g., from a DHCP server) during the data transfer session. Using known IP address information (e.g., IP address information 144) enables communication manager 140 to skip the act of obtaining an IP address for the wireless interface 132 during the data transfer session.

Once the wireless network connection is established with access point 102, communication manager 140 can employ the wireless interface 132 to transmit the environmental condition data 138 to access point 102 over the connection.

Techniques for Low-Energy Sensor Wireless Connection

The following discussion describes techniques for low-energy sensor wireless connection. These techniques can be implemented using the previously described environments or entities, such as communication manager 140 and wireless interface 132 of FIG. 1 embodied on a sensor device 104. These techniques include methods illustrated in FIGS. 2 and 3, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1 by way of example. Such reference is not to be taken as limited to operating environment 100 but rather as illustrative of one of a variety of examples.

Figure 2:
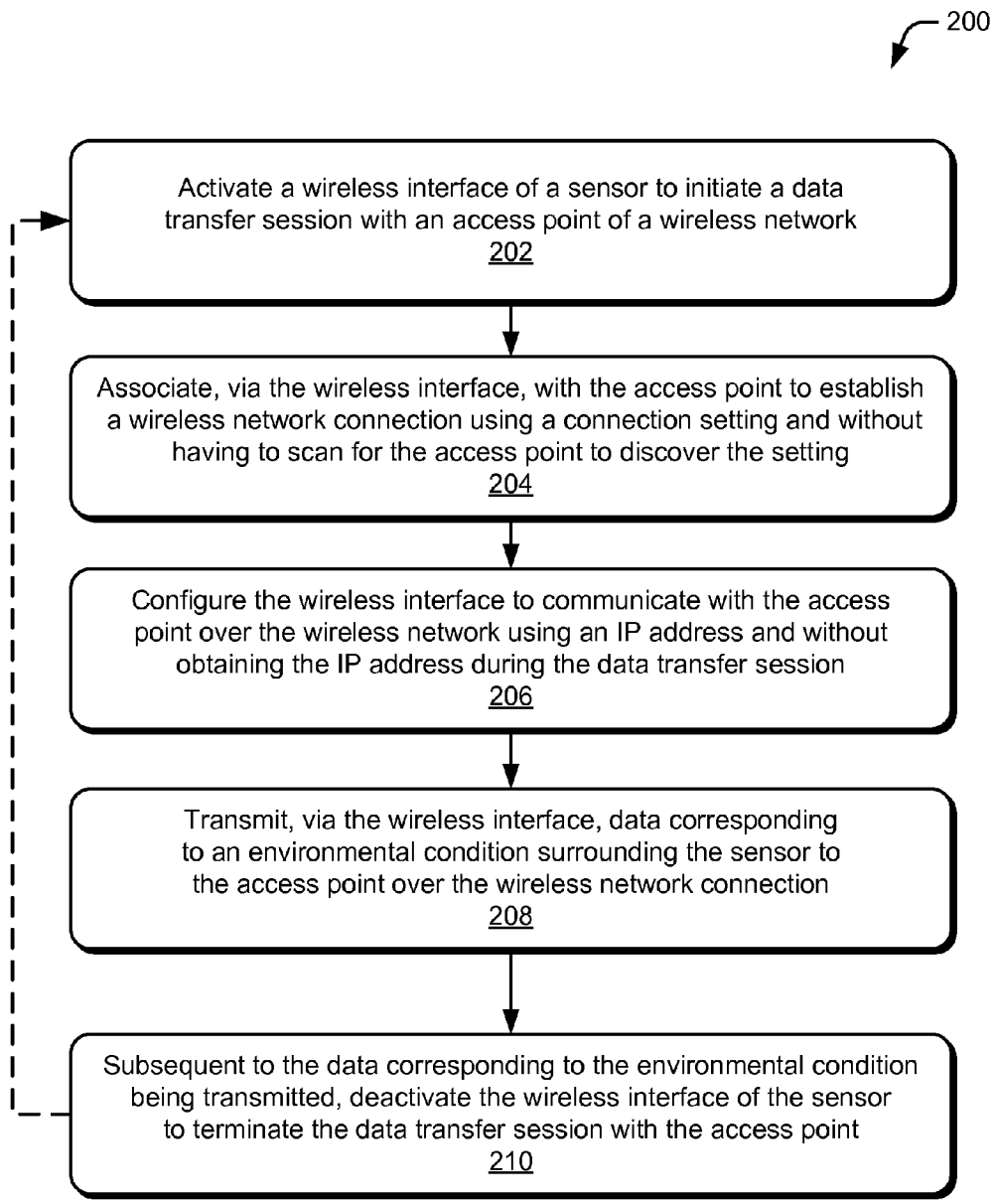
FIG. 2 illustrates a method for conducting a data transfer session between a low-power sensor and an access point over a wireless network connection established using connection settings and IP address information known to the low-power sensor in accordance with one or more aspects.

FIG. 2 depicts a method 200 for conducting a data transfer session between a low-power sensor and an access point over a wireless network connection established using connection settings and IP address information known to the low-power sensor.

At 202, a wireless interface of a sensor is activated to initiate a data transfer session with an access point of a wireless network. The wireless interface of the device may be implemented using a separate wireless receiver and wireless transmitter or one that is combined. The access point is associated with a wireless network over which the wireless interface of the sensor may be configured to communicate, such as a WLAN BSS. In the context of operating environment 100, communication manager 140 activates wireless interface 132 of sensor device 104 to initiate a data transfer session with access point 102.

At 204, the wireless interface associates with the access point in accordance with a setting that is usable to establish the wireless network connection. Further, the associating is performed without having to scan for the access point to discover the setting that is usable to establish the wireless network connection. Instead, connection settings are "known" to the wireless sensor. The connection settings may be "known" insofar as those settings were stored at the sensor in conjunction with a previous data transfer session for use with subsequent data transfer sessions, such as that for which the wireless interface is activated at act 202. Furthermore, performing the associating without scanning for the connection settings reduces the time spent to establish the wireless network connection with the access point.

In the context of operating environment 100, communication manager 140 causes the wireless interface 132 to associate with access point 102 using connection settings 142, which are stored at sensor device 104 on sensor CRM 136. The connection settings 142 may have been discovered and stored in conjunction with a previous data transfer session. At least some of the connection settings may have been discovered during the previous data transfer session by causing the wireless interface 132 to scan multiple channels for the access point 102. Using the settings discovered during that scan, the wireless interface 132 of the sensor device 104 may be associated with the access point 102. Once associated, the wireless interface 132 of the sensor device 104 may then be authenticated for communication with the access point 102, and additional connection settings obtained attendant thereto. By using the connection settings 142 stored at the sensor device 104, however, the acts of scanning and authenticating may be skipped during the data transfer session initiated at act 202.

At 206, the wireless interface is configured to communicate with the access point over the wireless network using an IP address. Further, the configuring of the wireless interface is performed without receiving the IP address during the data transfer session. Like the connection settings, the IP address is "known" to the wireless sensor insofar as that information was stored at the sensor in conjunction with a previous data transfer session for use with subsequent data transfer sessions. Thus, rather than acquire the IP address information during the data transfer session, the wireless interface may instead skip that part of establishing a network connection. This also has the result of reducing the time spent establishing a wireless network connection with the access point.

In the context of operating environment 100, communication manager 140 configures the wireless interface 132 to communicate with the access point 102 over the wireless network using IP address information 144, which is stored at sensor device 104 on sensor CRM 136. During a previous data transfer session, IP address information may have been assigned for the wireless interface 132 by a DHCP server. To cause the DHCP server to assign an IP address several acts may be performed, including broadcasting packets to discover the DHCP server, performing a DHCP handshake, and accepting the assigned IP address from the DHCP server. By using the IP address information 144 stored at the sensor device 104, however, the acts attendant with obtaining IP address information from a DHCP server may be skipped during the data transfer session initiated at act 202.

As part of configuring the wireless interface using the IP address, a determination is made as to whether other nodes on the wireless network have a conflicting IP address. Address resolution protocol (ARP) probe requests may be used make this determination. If a conflict is found based on the ARP probe requests, then the acts described above for newly assigning an IP address may be performed, e.g., broadcasting packets to discover the DHCP server, and so on. If no conflict is found, however, the wireless interface may be configured accordingly, and method 200 may continue with act 208.

At 208, data generated by the wireless sensor that corresponds to an environmental condition surrounding the wireless sensor is transmitted via the wireless interface to the access point over the established network connection. In the context of operating environment 100, communication manager 140 causes the wireless interface 132 to transmit the environmental condition data 138 to the access point 102 over the wireless network connection. The environmental condition data 138 may be generated from physical and environmental conditions sensed by the sensing component 126 both during and outside of data transfer sessions. In some implementations, however, the sensing component 126 may sense the environmental conditions solely during data transfer sessions. In that way, both the sensing of conditions and transmitting of data are performed while the sensor is in an active state.

At 210, the wireless interface of the sensor is deactivated to terminate the data transfer session with the access point. The deactivation of the wireless interface is performed subsequent to the data corresponding to the environmental condition surrounding the sensor being transmitted. In the context of operating environment 100, the wireless interface 132 has already transmitted the environmental condition data 138 to the access point 102 over the wireless network connection. Accordingly, the communication manager 140 then deactivates the wireless interface 132 of the sensor device 104. Deactivation of the wireless interface 132 terminates the data transfer session with the access point 102 that was initiated at act 202.

To initiate a data transfer session with the access point subsequent to that initiated at act 202, the wireless interface of the sensor is again activated, which is indicated by the dashed arrow leaving the block representative of act 210. A subsequent such data transfer session, may also use the connection settings 142 and the IP address information 144 to bypass the above-noted acts that may be performed to establish a network connection with the access point, such as scanning for the access point, authenticating the wireless interface, and acts for obtaining an IP address from a DHCP server. Prior to initiating the data transfer session at act 202 and subsequent data transfer sessions, which establish wireless network connections with the access point 102, the connection settings 142 and the IP address information 144 must be obtained.

Figure 3:
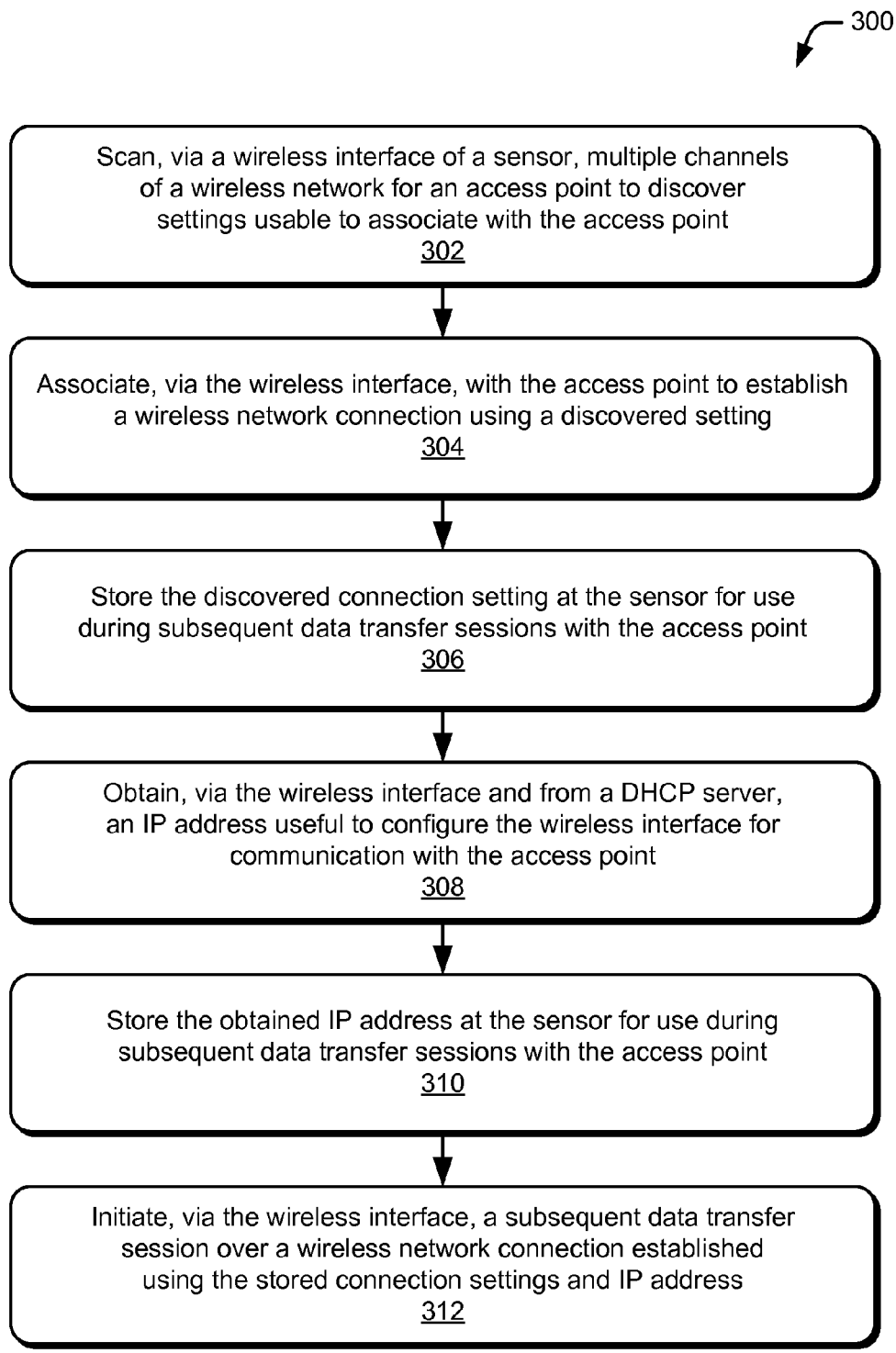
FIG. 3 illustrates a method for conducting a data transfer session between the low-power sensor and the access point over the wireless network connection, and in which the connection settings are discovered and IP address information is obtained for use in subsequent data transfer sessions in accordance with one or more aspects.

FIG. 3 depicts a method 300 for conducting a data transfer session between a low-power sensor and an access point over a wireless network connection, and in which the connection settings are discovered and the IP address information is obtained for use in subsequent data transfer sessions. Method 300 is performed before method 200 may be performed because method 200 uses connection settings and IP address information that become "known" to the sensor as a result of method 300. Portions of method 300 may also be performed when the connection settings and IP address information known to the sensor become stale such that performing portions of method 300 updates the known connection settings and IP address.

At 302, a wireless interface of a sensor scans multiple channels of a wireless network for an access point to discover connection settings used to associate with the access point. In the context of operating environment 100, the wireless interface 132 scans multiple channels of a wireless network with which the access point 102 is associated. As a result of the scan, the wireless interface 132 discovers connection settings that enable the wireless interface 132 to attempt an association with the access point 102.

At 304, the wireless interface associates with the access point using the discovered connection settings. In the context of operating environment 100, the wireless interface 132 associates with the access point 102 using the connection settings discovered as a result of act 302. Once associated with the access point 102, the wireless interface 132 may also be authenticated to establish the wireless network connection with the access point 102. The connection settings that enable the association of the wireless interface 132 with the access point as well as those attendant to the authentication of the wireless interface 132 (e.g., connection settings 142) may be useful for establishing subsequent data transfer sessions, such as that initiated at act 202.

At 306, the connection settings are stored at the sensor for use during subsequent data transfer sessions with the access point. In the context of operating environment 100, the connection settings discovered at act 302 are stored in sensor CRM 136 as the connection settings 142. Settings attendant to authentication of the wireless interface 132 are also stored in the sensor CRM 136. The connection settings 142 stored in sensor CRM 136 may be used from storage with subsequent data transfer sessions, such as that initiated at act 202.

At 308, the wireless interface obtains from a DHCP server an IP address that is useful to configure the wireless interface for communication with the access point. In the context of operating environment 100, the wireless interface 132 obtains an IP address from a DHCP server (not shown). The obtained IP address may be useful by the communication manager 140 to configure the wireless interface 132 for communication with the access point 102 for subsequent data transfer sessions. To obtain the IP address from the DHCP server several other steps are performed, including broadcasting packets to discover the DHCP server and performing a DHCP handshake with the server.

At 310, the obtained IP address is stored at the sensor for use during subsequent data transfer sessions with the access point. In the context of operating environment 100, the IP address received from the DHCP server at act 308 is stored in sensor CRM 136 as IP address information 144. Other settings attendant to IP address assignment are also stored in sensor CRM 136, such as a DHCP lease timeout. The IP address information stored in sensor CRM 136 may be used from storage with subsequent data transfer sessions, such as that initiated at act 202.

At 312, a subsequent data transfer session is initiated via the wireless interface over a wireless network connection that is established using the stored connection settings and IP address. By way of example, the connection settings stored at act 306 (e.g., connection settings 142) and the IP address information stored at act 310 (e.g., IP address information 144) are used to establish a wireless network connection between the wireless interface 132 of the sensor device 104 and the access point 102. During the subsequent data transfer session, environmental condition data 138 is transmitted to access point 102 by way of the wireless connection established using the information stored at the sensor device 104 (e.g., connection settings 142 and IP address information 144).

As noted above, the known information to enable a wireless network connection (e.g., the connection settings 142 and IP address information 144) may become stale. To update this information, some portions of method 300 may again be performed while other portions of method 300 are not. When the connection settings 142 become stale for example, the scan for the access point at act 302, the association with the access point at act 304 as well as the authentication of the wireless interface, and/or the storing of the discovered connection settings at act 306, may be performed to update the connection settings 142. The connection settings 142 may be considered stale when an error is received as a result of attempting to associate with the access point 102 or an attempt fails for other reasons during a subsequent data transfer session. The connection settings 142 may also be considered stale when the access point 102 broadcasts updated connection settings while associated with the wireless interface 132, however. When updated connection settings are broadcast while associated with the wireless interface 132, those settings may simply be stored, as at act 306. The acts associated with obtaining and storing the IP address information (e.g., acts 308 and 310), however, may not be performed when just the connection settings become stale.

Likewise, the acts associated with obtaining and storing the connection settings (e.g., acts 302, 304, 306) may not be performed when just the IP address information 144 becomes stale. Instead, solely the obtaining of the IP address information at act 308 and the storing of the IP address information at act 310 may be performed to update the IP address information 144. The IP address information 144 may be considered stale when the DHCP lease timeout is determined to have expired or a node in the wireless network other than the sensor device is determined to have been assigned the IP address given to the wireless interface 132. These determinations may be made as part of configuring the wireless interface 132 for communication with the access point 102 during subsequent data transfer sessions, such as at act 206. To update the IP address information, each of the acts associated with obtaining an IP address from the DHCP server may again be performed, including broadcasting packets to discover the DHCP server, performing a DHCP handshake, and accepting a newly assigned IP address from the DHCP server.

Timeline of Acts for Low-Energy Sensor Wireless Connection

Figure 4:
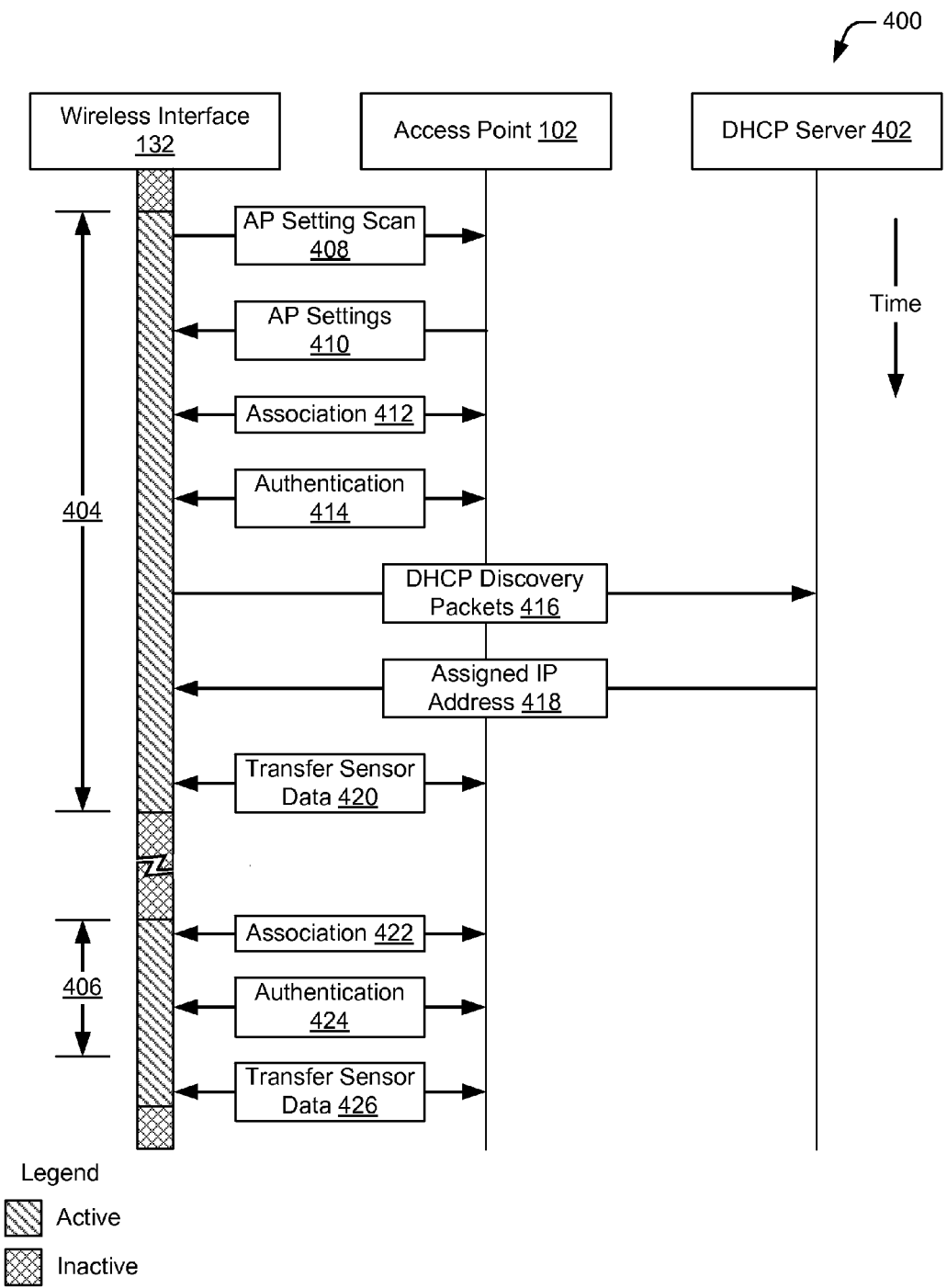
FIG. 4 illustrates an example timeline of low-power sensor wireless connection techniques in accordance with one or more aspects.

FIG. 4 illustrates an example timeline of low-energy sensor wireless connection in accordance with one or more aspects at 400. Generally, the timeline illustrates when the acts of methods 200 and 300 are performed and the information that is passed between the wireless interface 132 of the sensor device 104, the access point 102, and the DHCP server 402. Time slice 404 represents a first data transfer session during which acts of method 300 may be performed to initially obtain connection settings and IP address information. Time slice 406 represents a second data transfer session during which acts of method 200 may be performed, such that the connection settings and IP address information stored during time slice 404 are used to establish a network connection between the wireless interface 132 and the access point 102.

The first data transfer session, represented by time slice 404, may be initiated when communication manager 140 activates wireless interface 132. During time slice 404, the wireless interface 132 broadcasts packets over multiple channels to scan for an access point of a wireless network. The scan performed by the wireless interface is depicted in the illustrated example as access point setting scan 408 (AP setting scan 408). As a result of the scan, the wireless interface 132 may discover connection settings for the access point 102. The connection settings discovered by the access point 102 are represented in the illustrated example as access point settings (AP settings 410). Access point 102 may broadcast AP settings 410 to enable multiple sensor devices to establish a wireless network connection with the access point 102.

Using the AP settings 410, an association 412 may then be formed between the wireless interface 132 and the access point 102. By way of example, the wireless interface 132 may associate with the access point 102 as at act 304 of FIG. 3. Once association 412 is formed, authentication 414 may be performed to configure firmware of the sensor device 104 to authenticate with the access point 102 based on security configurations. AP settings 410 and the settings attendant to the authentication 414 may then be stored in sensor CRM 136 for use during subsequent data transfer sessions.

After authentication 414 is performed, address assignment using the DHCP server 402 is performed. As part of the address assignment, wireless interface 132 may broadcast DHCP discovery packets 416. A DHCP handshake between the wireless interface 132 and the DHCP server 402 is then performed (not shown). After the DHCP handshake is performed, DHCP server 402 assigns an IP address to wireless interface 132. The assigned IP address 418 is obtained by the wireless interface from DHCP server along with a DHCP lease timeout, which indicates a time period over which the assigned IP address 418 is valid.

Given the assigned IP address 418, the wireless interface 132 may be configured for communication with the access point 102. After the wireless interface 132 is configured using the assigned IP address 418, the wireless interface 132 can transfer sensor data 420 to the access point 102 for aggregation and analysis. By way of example, the wireless interface can transfer environmental condition data 138 to access point 102 for aggregation and analysis. The sensor data transferred to the access point 102 may be derived from physical or environmental conditions sensed during time slice 404. On the other hand, the transferred sensor data may be indicative of physical or environmental conditions sensed outside of time slice 404. In either case, after the transfer of sensor data 420, the wireless interface 132 is deactivated thereby terminating the first data transfer session. When the wireless interface 132 is deactivated, sensor device 104 may transition to functioning in a low-power or shutdown state.

To initiate the second data transfer session, represented by time slice 406, the wireless interface 132 may again be activated, and thereby cause sensor device 104 to transition from a low-power or shutdown state to an active state. During time slice 406, the wireless interface 132 does not perform an AP setting scan 408 as was performed during time slice 404. Rather, an association 422 is formed as at act 204 between the wireless interface 132 and access point 102 using known connection settings (e.g., AP settings 410). Further, authentication is not performed during time slice 406 because settings attendant to the authentication 414 are used from storage to establish a wireless network connection with the access point 102.

After association 422, the wireless interface 132 is configured for communication as at act 206 to communicate with the access point 102 using known IP address information (e.g., assigned IP address 418). Once association 422 is formed, authentication 424 may be performed. Unlike authentication 414, however, authentication 424 takes advantage of the already-configured firmware of the sensor to authenticate with the access point 102 based on security configurations, e.g., generation of an authentication secret is optimized in the firmware and does not need to be repeated during authentication 424.

Once authenticated, the wireless interface can transfer sensor data 426 to the access point 102 for aggregation and analysis. By way of example, the wireless interface can again transfer environmental condition data 138 to access point 102. The data transferred during this second data transfer session may be indicative of physical or environmental conditions sensed since the sensor data was transferred during the first wireless interface. In this way, data indicative of the environmental conditions may be transmitted to the access point 102 from the sensor device 104 on a periodic basis. Responsive to transfer of the sensor data 426 (or 420) environmental condition data 138 may be cleared from storage of the sensor device 104. Clearing the environmental condition data 138 on a regular basis (e.g., each time the data is transferred) may make room for additional such data derived from environmental conditions sensed by the sensor device 104.

Concluding the present example, the wireless interface 132 is deactivated after the transfer of sensor data 426 thereby terminating the second data transfer session. Thus, the sensor device 104 may again transition to functioning in a low-power or shutdown state.

System-on-Chip

Figure 5:
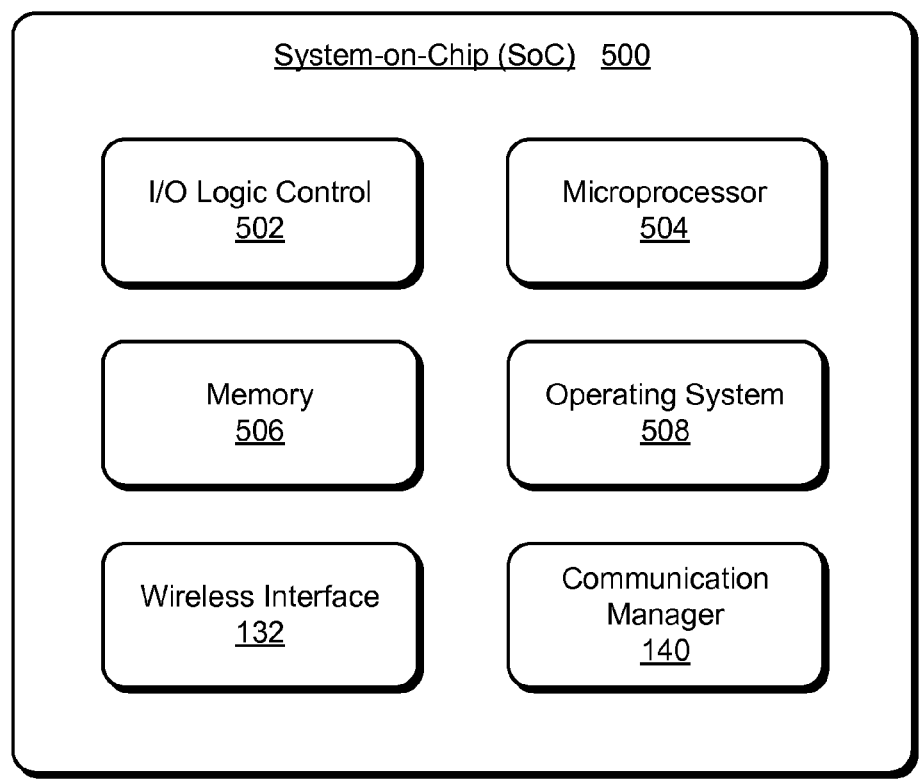
FIG. 5 illustrates a System-on-Chip (SoC) environment for implementing aspects of the techniques described herein.

FIG. 5 illustrates a System-on-Chip (SoC) 500, which can implement various aspects of low-power sensor wireless connection as described above. A SoC can be implemented in any suitable sensor device, such as a temperature sensing device, medical implant device, optical sensing device, and/or any other type of device that may sense physical and environmental conditions and communicate data indicative of the conditions sensed by the sensor over wireless networks. Some example sensor devices that may be implemented as a SoC can include but is not limited to pacemakers, internal insulin delivery devices, security sensors, meteorological sensors, food preparation sensors, fire-detection sensors, and so on.

SoC 500 can be integrated with electronic circuitry, a microprocessor, memory, input-output (I/O) logic control, communication interfaces and components, other hardware, firmware, and/or software needed to provide communicative coupling for a device, such as any of the above-listed devices. SoC 500 can also include an integrated data bus or crossbar (not shown) that couples the various components of the SoC for data communication between the components. A wired or wireless communication device that includes SoC 500 can also be implemented with many combinations of differing components. In some cases, these differing components may be configured to implement concepts described herein over various types of wireless connections.

In this example, SoC 500 includes various components such as an input-output (I/O) logic control 502 (e.g., to include electronic circuitry) and a microprocessor 504 (e.g., any of a microcontroller or digital signal processor). SoC 500 also includes a memory 506, which can be any type of RAM, low-latency nonvolatile memory (e.g., Flash memory), ROM, and/or other suitable electronic data storage. SoC 500 can also include various firmware and/or software, such as an operating system 508, which can be computer-executable instructions maintained by memory 506 and executed by microprocessor 504. SoC 500 can also include other various communication interfaces and components, communication components, other hardware, firmware, and/or software.

SoC 500 includes wireless interface 132 and communication manager 140 (embodied as disparate or combined components as noted above). Examples of these various components, functions, and/or entities, and their corresponding functionality, are described with reference to the respective components of the environment 100 shown in FIG. 1.

Communication manager 140, either independently or in combination with other entities, can be implemented as computer-executable instructions maintained by memory 506 and executed by microprocessor 504 to implement various embodiments and/or features described herein. Communication manager 140 may also be provided integral with other entities of the SoC, such as integrated with one or both of I/O logic controller 502 or any wireless interface within, or associated with, SoC 500. Alternatively or additionally, communication manager 140 and the other components can be implemented as hardware, firmware, fixed logic circuitry, or any combination thereof that is implemented in connection with the I/O logic control 502 and/or other signal processing and control circuits of SoC 500.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
activating a wireless interface of a sensor to initiate a data transfer session with an access point of a wireless network, the sensor being configured to generate data corresponding to an environmental condition surrounding the sensor and store the data in a sensor data storage that is associated with the sensor;
associating the wireless interface with the access point to establish a wireless network connection with the access point, the associating being performed:
(i) in accordance with a setting that is usable to establish the wireless network connection with the access point, and
(ii) without having to scan for the access point to discover the setting that is usable to establish the wireless network connection;
after associating the wireless interface with the access point, configuring the wireless interface to communicate with the access point over the wireless network connection using an Internet Protocol (IP) address, the configuring being performed without obtaining the IP address during the data transfer session;
transmitting, via the wireless interface, the data to the access point, the data being transmitted over the wireless network connection during the data transfer session;
responsive to transmitting the data to the access point, clearing the data from the sensor data storage; and
subsequent to the data being transmitted from the sensor to the access point, deactivating the wireless interface of the sensor to terminate the data transfer session with the access point.

2. The method of claim 1, further comprising, prior to the act of activating the wireless interface to initiate the data transfer session, discovering the setting that is usable to establish the wireless network connection with the access point or obtaining the IP address that is used to configure the wireless interface.

3. The method of claim 2, wherein discovering the setting that is usable to establish the wireless network connection with the access point comprises:
scanning multiple channels of the wireless network for the access point to discover settings that are usable to associate with the access point; and
storing a discovered setting at the sensor as the setting that is usable to establish the wireless network connection with the access point for use during subsequent data transfer sessions with the access point.

4. The method of claim 2, wherein obtaining the IP address that is used to configure the wireless interface comprises:
obtaining, from a Dynamic Host Configuration Protocol (DHCP) server, a newly assigned IP address that is useful to configure the wireless interface for communication with the access point; and
storing the newly assigned IP address at the sensor as the IP address that is used to configure the wireless interface for communication during subsequent data transfer sessions with the access point.

5. The method of claim 1, further comprising:
attempting to associate with the access point, the attempt resulting in an unsuccessful association with the access point;
in response to the unsuccessful association with the access point, scanning multiple channels of the wireless network for the access point to discover settings that are usable to associate with the access point; and
storing a discovered setting at the sensor as an update to the setting that is usable to establish the wireless network connection with the access point and for use during subsequent data transfer sessions with the access point.

6. The method of claim 1, further comprising:
determining that the IP address is no longer useful to enable the wireless interface to communicate with the access point over the wireless network connection;
in response to the determining, obtaining, from a Dynamic Host Configuration Protocol (DHCP) server, a newly assigned IP address that is useful to configure the wireless interface for communication with the access point; and
storing the newly assigned IP address at the sensor as an update to the IP address that is usable to configure the wireless interface and for use during subsequent data transfer sessions with the access point.

7. The method of claim 1, wherein the data corresponding to the environmental condition surrounding the sensor is generated by the sensor during the data transfer session.

8. The method of claim 1, wherein the data corresponding to the environmental condition surrounding the sensor is generated by the sensor at a time outside of the data transfer session.

9. A device comprising:
a sensing component configured to generate data corresponding to an environmental condition surrounding the sensing component and store the data in a storage associated with the sensing component;
a wireless interface that is configurable to communicate with an access point of a wireless network;
a communication manager configured to:
activate the wireless interface to initiate a data transfer session with the access point;
cause the wireless interface to associate with the access point to establish a wireless network connection with the access point, the the wireless interface being caused to associate with the access point:
(i) in accordance with a setting that is usable to establish the wireless network connection with the access point, and
(ii) without having to scan for the access point to discover the setting that is usable to establish the wireless network connection;
configure the wireless interface to communicate with the access point over the wireless network connection using an Internet Protocol (IP) address, the wireless interface being configured without the wireless interface obtaining the IP address during the data transfer session;
cause the wireless interface to transmit the data to the access point, the data being transmitted over the wireless network connection during the data transfer session;
responsive to the data being transmitted to the access point, clear the data from the storage associated with the sensing component; and
subsequent to the data being transmitted to the access point, deactivate the wireless interface to terminate the data transfer session with the access point.

10. The device of claim 9, wherein the communication manager is further configured to cause, prior to activating the wireless interface to initiate the data transfer session, the wireless interface to discover the setting that is usable to establish the wireless network connection with the access point or obtain the IP address that is used to configure the wireless interface.

11. The device of claim 10, wherein the communication manager is further configured to:
    cause the wireless interface to scan multiple channels of the wireless network to discover settings that are usable to associate with the access point; and
    store a discovered setting as the setting that is usable to establish the wireless network connection with the access point for use during subsequent data transfer sessions with the access point.

12. The device of claim 10, wherein the communication manager is further configured to:
    cause the wireless interface to obtain, from a Dynamic Host Configuration Protocol (DHCP) server, a newly assigned IP address that is useful to configure the wireless interface for communication with the access point; and
    store the newly assigned IP address as the IP address that is used to configure the wireless interface for communication during subsequent data transfer sessions with the access point.

13. The device of claim 9, wherein the communication manager is further configured to:
    cause the wireless interface to attempt to associate with the access point;
    when the attempt results in an unsuccessful association with the access point, cause the wireless interface to scan multiple channels of the wireless network for the access point to discover settings that are usable to associate with the access point; and
    store a discovered setting as an update to the setting that is usable to establish the wireless network connection with the access point and for use during subsequent data transfer sessions with the access point.

14. The device of claim 9, wherein the communication manager is further configured to:
    in response to a determination that the IP address is no longer useful to enable the wireless interface to communicate with the access point over the wireless network connection, cause the wireless interface to obtain, from a Dynamic Host Configuration Protocol (DHCP) server, a newly assigned IP address that is useful to configure the wireless interface for communication with the access point; and
    store the newly assigned IP address as an update to the IP address that is usable to configure the wireless interface and for use during subsequent data transfer sessions with the access point.

15. One or more computer-readable memory devices embodying processor-executable instructions that, responsive to execution by a processor, implement a communication manager to:
    activate a wireless interface of a sensor to initiate a data transfer session with an access point of a wireless network, the sensor being configured to generate data corresponding to an environmental condition surrounding the sensor and store the data in a sensor data storage that is associated with the sensor;
    cause the wireless interface to associate with the access point to establish a wireless network connection with the access point, the wireless interface being caused to associate with the access point by performing the association:
        (i) in accordance with a setting that is usable to establish the wireless network connection with the access point, and
        (ii) without having to scan for the access point to discover the setting that is usable to establish the wireless network connection;
    configure the wireless interface to communicate with the access point over the wireless network connection using an Internet Protocol (IP) address, the wireless interface being configured without the wireless interface obtaining the IP address during the data transfer session;
    cause the wireless interface to transmit the data to the access point, the data being corresponding to the environmental condition surrounding the sensor is transmitted over the wireless network connection during the data transfer session; and
    responsive to the data being transmitted from the sensor to the access point, clear the data from the sensor data storage and deactivate the wireless interface of the sensor to terminate the data transfer session with the access point.

16. The one or more computer-readable memory devices of claim 15, further comprising additional processor-executable instructions that, responsive to execution by the processor, implement the communication manager to cause, prior to activating the wireless interface to initiate the data transfer session, the wireless interface to discover setting that is usable to establish the wireless network connection with the access point or obtain the IP address that is used to configure the wireless interface.

17. The one or more computer-readable memory devices of claim 16, further comprising additional processor-executable instructions that, responsive to execution by the processor, implement the communication manager to:
    cause the wireless interface to scan multiple channels of the wireless network to discover settings that are usable to associate with the access point; and
    store a discovered setting as the setting that is usable to establish the wireless network connection with the access point for use during subsequent data transfer sessions with the access point.

18. The one or more computer-readable memory devices of claim 16, further comprising additional processor-executable instructions that, responsive to execution by the processor, implement the communication manager to:
    cause the wireless interface to obtain, from a Dynamic Host Configuration Protocol (DHCP) server, a newly assigned IP address that is useful to configure the wireless interface for communication with the access point; and
    store the newly assigned IP address at the sensor as the IP address that is used to configure the wireless interface for communication during subsequent data transfer sessions with the access point.

19. The one or more computer-readable memory devices of claim 15, further comprising additional processor-executable instructions that, responsive to execution by the processor, implement the communication manager to:
    cause the wireless interface to attempt to associate with the access point;
    when the attempt results in an unsuccessful association with the access point, cause the wireless interface to scan multiple channels of the wireless network for the access point to discover settings that are usable to associate with the access point; and
    store a discovered setting at the sensor as an update to the setting that is usable to establish the wireless network connection with the access point and for use during subsequent data transfer sessions with the access point.

20. The one or more computer-readable memory devices of claim 15, further comprising additional processor-executable instructions that, responsive to execution by the processor, implement the communication manager to:
- in response to a determination that the IP address is no longer useful to enable the wireless interface to communicate with the access point over the wireless network connection, cause the wireless interface to obtain, from a Dynamic Host Configuration Protocol (DHCP) server, a newly assigned IP address that is useful to configure the wireless interface for communication with the access point; and
- store the newly assigned IP address at the sensor as an update to the IP address that is usable to configure the wireless interface and for use during subsequent data transfer sessions with the access point.

\* \* \* \* \*